Patented Mar. 10, 1942

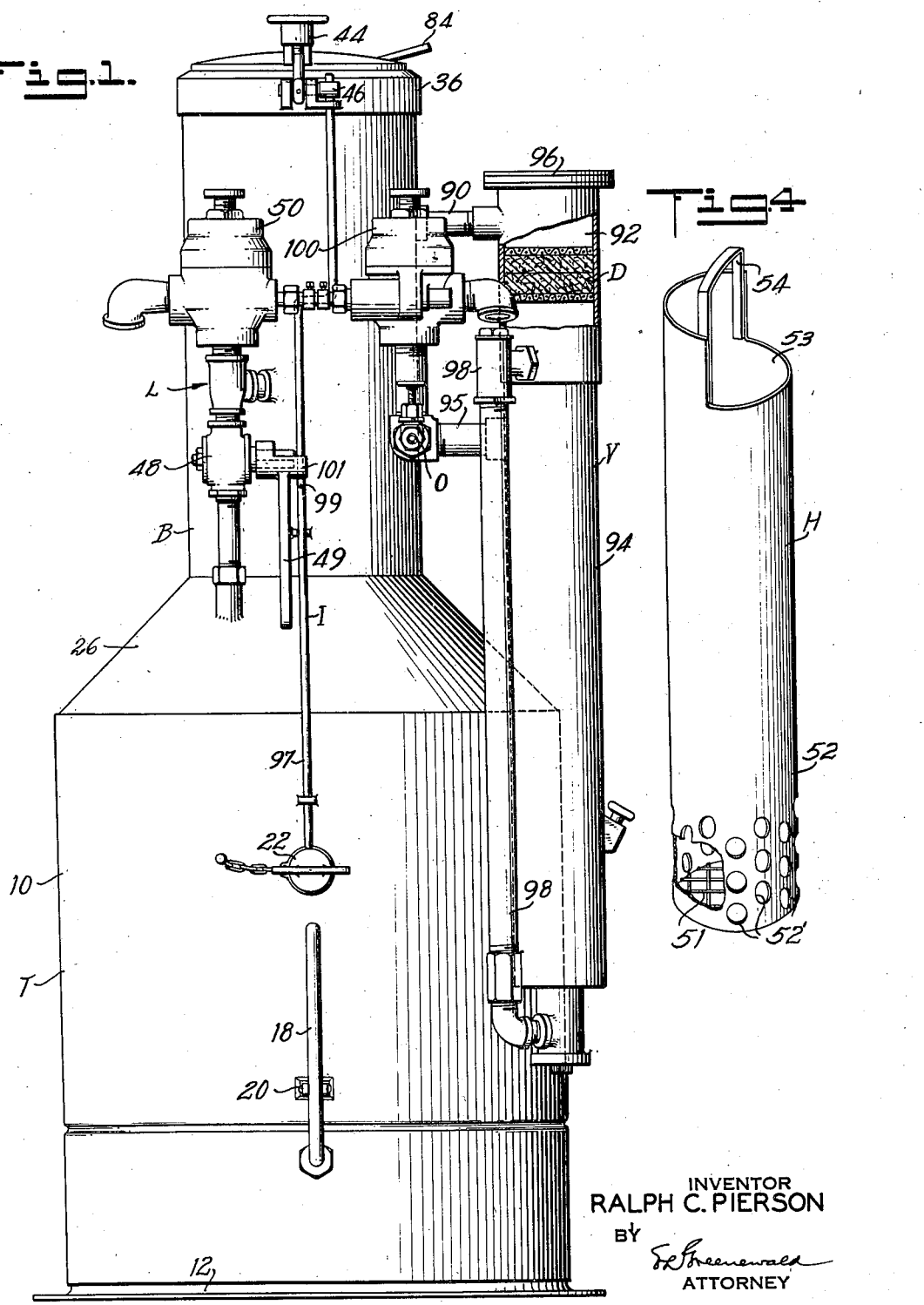

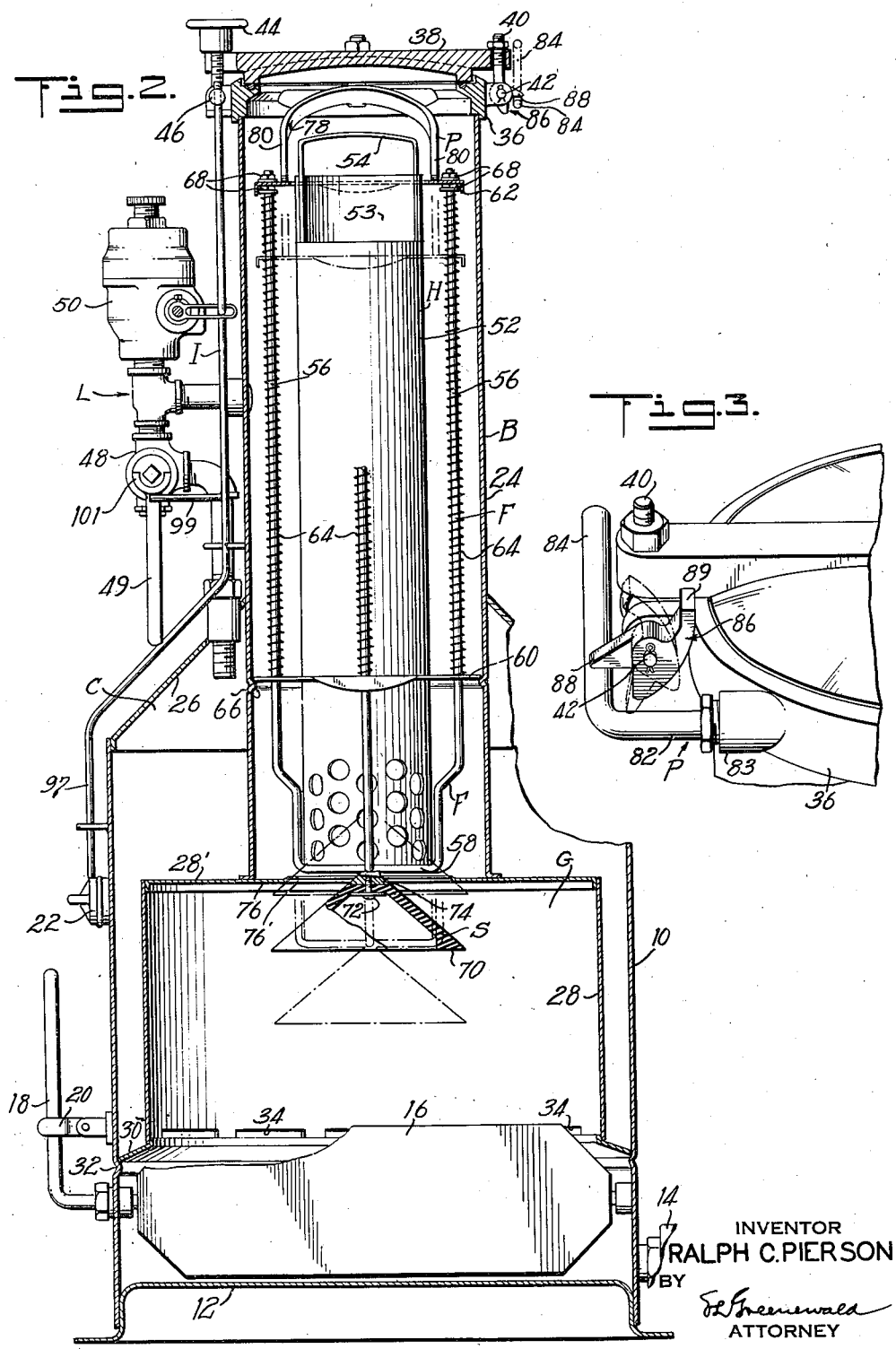

2,275,990

UNITED STATES PATENT OFFICE 2,275,990

ACETYLENE GENERATOR

Ralph C. Pierson, Indianapolis, Ind., assignor to Oxweld Acetylene Company, a corporation of West Virginia Application February 18, 1939, Serial No. 257,092

16 Claims. (Cl. 48—22)

This invention relates to acetylene generators of the water-recession type.

Generators of this general class are usually provided with an open-ended acetylene generating chamber at least partially submerged within a body of water. The water is adapted to flow into and out of the generating chamber in accordance with the pressure of acetylene generated therein. Calcium carbide is usually supported within the generating chamber in position to be partially submerged by the water upon lowering of the pressure of generated acetylene.

When it is desired to shut down such generators over night, or for an extended period of time, it is necessary to remove the carbide from the generator, otherwise after-generation of acetylene will occur due to a reaction between the carbide and the water vapor above the main body of water. This needless after-generation of acetylene may become sufficient to open the pressure-relief valves of the generator and thereby entail a loss of acetylene and the possibility of creating an explosive mixture about the outside of the generator.

When such generators are moved from place to place while charged with carbide, the splashing of the water within the generating chamber causes an undesirable generation of acetylene.

The principal object of this invention is to provide an acetylene generator of the water-recession type which will avoid the above and other difficulties. Other objects of this invention include the provision of an acetylene generator having means for sealing off the calcium carbide from the water within the generator during extended periods of idleness; the provision of such a generator having means which normally urges an element into sealing engagement with a portion of the generator to provide a closed chamber about the calcium carbide; the provision of such a generator in which the calcium carbide may be positively located at any one of a plurality of elevations relative to the water level within the generator; and the provision of such a generator in which the calcium carbide is supported within the generating chamber by means which also supports the sealing element, and in which the supporting means may be held at various elevations relatively to the water level within the generator.

The above and other objects and novel features of the invention will become apparent from the following specification and the accompanying drawings, in which:

Fig. 1 is an elevational view, partly in section, of an acetylene generator to which the principles of this invention have been applied;

Fig. 2 is a vertical sectional view of the acetylene generator of Fig. 1, with certain parts shown in elevation and others removed for clarity;

Fig. 3 is an enlarged perspective view of a portion of the top of the generator as shown in Fig. 2 turned through 180 degrees to show a specific feature of the apparatus; and Fig. 4 is a perspective view of a carbide holder adapted to be employed within the generator.

The invention is shown as applied to an acetylene generator of the type adapted to generate acetylene at pressures in excess of that of the atmosphere. The principles of this invention are not limited to the specific type of generator shown, but are equally applicable to any type of water-recession generator.

Referring to Figs. 1 and 2 of the drawings, the specific generator disclosed comprises a substantially cylindrical tank T adapted to contain water in its lower portion and to form a gas-compression chamber C in its upper portion. A gas bell B is integrally connected to the tank T and extends upwardly above said tank and downwardly thereinto forming a generating chamber G within the tank T. The chambers C and G are adapted to be connected by a by-pass pipe L including a three-way valve for establishing communication between said chambers, as well as between chamber C and the atmosphere.

A vertically movable carbide-holder-supporting frame F is mounted within the upper portion of bell B and is adapted normally to support the lower end of a calcium carbide holder H a few inches above the common level of the water within tank T. The frame F is normally urged vertically upward and carries a sealing element S which is adapted to cooperate with a portion of bell B to provide a closed chamber about the calcium carbide and thereby to isolate it from the water or water vapor within tank T. A positioning means P is mounted within the top of the bell B and is adapted to be operated to locate the frame F at various elevations relatively to the water level within tank T. With the valve in pipe L set to establish communication between chambers C and G, the positioning device P is operated to depress frame F to its lowest position and thereby submerge, within the water in tank T, the lower end of carbide holder H thereby effecting the generation of acetylene.

The three-way valve in pipe L enables purging of the air-gas mixture within chamber C, and when this has been done and the pressure of acetylene within chambers G and C is sufficient for operating purposes, the valve in pipe L is positioned to interrupt communication between chambers C and G. The device P is then released, permitting the frame F to rise only until the lower end of the holder H is a few inches above the water level in tank T. The frame F is prevented from rising further by a latch associated with the device P, thus preventing the upward movement of said frame to a point where the seal S becomes effective. Generation of acetylene then becomes automatic. As the acetylene in chamber G is consumed, the pressure within chamber C causes the water in chamber G to rise and contact the carbide, thereby generating acetylene until the operating pressure within chamber G is again established.

When it is desired to shut down the generator over night, for extended periods, or during periods of transportation of the charged generator, it is only necessary to release the device P so that frame F is moved to its uppermost position where seal S becomes effective to prevent generation of acetylene due to the water vapor and/or the splashing of the water when the charged generator is moved over rough terrain.

The tank T comprises a shell 10 fixed to a base plate 12 which latter forms a bottom for tank T. The tank T is provided with the usual sludge-withdrawal valve 14; agitator assembly 16 including a handle 18 adapted to be releasably held in a vertical position by a yoke element 20; and a water overflow opening closed by a plug 22.

The gas bell B comprises an elongated tube 24 having a frusto-conical apron 26 welded thereto between its ends. The lower end of the tube 24 is secured to the top 28' of an open-ended cylindrical shell 28 of larger diameter than the tube 24 and adapted to form the generating chamber G within tank T. The bell B is hermetically secured to shell 10 by a welded joint between the top of shell 10 and the lower edge of the apron 26.

The lower portion of the shell 28 is secured to an outwardly flaring flange 30 which rests upon an internal bead 32 rolled into the side of shell 10. This construction relieves the joint between apron 26 and shell 10 from the entire weight of the bell B. This construction also prevents small bubbles of acetylene from passing around the periphery of the flange 30 and up into the compression chamber C.

The tank T is adapted to contain water to the level of the overflow opening which is closed by the plug 22, and free circulation of the water between chambers C and G is maintained by providing a series of apertures 34 spaced circumferentially about the shell 28 just above the flange 30.

The upper end of the tube 24 has welded thereto a relatively thicker flange 36 adapted to form, with a cover plate 38, an adequate closure for the generator. The cover 38 is pivoted to the flange 36 by an eye bolt and nut 40 mounted on a pivot pin 42. The cover 38 may be held in sealed relation with the flange 36 by a handwheel 44 pivotally connected to the flange 36 by a pin 46.

A three-way valve 48 having an operating handle 49, is provided in the by-pass pipe L for establishing and interrupting gaseous communication between the chambers C and G as well as establishing communication between chamber C and the atmosphere. A pressure-relief valve 50 communicates with the by-pass pipe L for relieving excessive pressures within the generating and compression chambers G and C. The by-pass L and the three-way valve 48 are more fully described and claimed in a copending application Serial No. 164,105, filed September 16, 1937, now Patent No. 2,242,571, dated May 20, 1941, in which I am a joint inventor.

The carbide holder H comprises a tube 52 which is of substantially smaller diameter than the tube 24 and is open at its top and fitted with a wire screen 51 at its bottom. The holder H has a semi-cylindrical opening 53 adjacent a handle 54, for facilitating the insertion of cakes of calcium carbide. Just above the screen 51, the side wall of the holder H is perforated, as at 52', to expose the lowest carbide cake in the holder to the water within the tank T when the lower end of the holder H is submerged in the water.

The holder H is supported for vertical movement within the tube 24 of the gas bell B. The supporting member for the holder H comprises the frame F which includes four vertically-arranged rods 56 spaced 90 degrees apart and having their lower ends bent at 90 degrees to the vertical to form arms 58 which are respectively joined together to provide a suitable support for the holder H. The frame F is supported within the tube 24 by a lower ring 60 and an upper ring 62, each of these rings having four holes, severally aligned in pairs, to permit the rods 56 to pass therethrough. A separate coiled spring 64 encircles each of the rods 56 and abuts against the upper face of the ring 60 and against the lower face of the ring 62. The lower ring 60 rests upon an internal bead 66 rolled into the tube 24, while the upper ring 62 is held in place by nuts 68 screw-threaded onto the upper ends of the rods 56 and bearing against opposite faces of the ring 62.

To prevent after-generation of acetylene during extended periods of shut-down, and to prevent the splashing of the water within the tank T onto the carbide when the charged generator is moved over rough surfaces, the seal S is connected to the bottom of the frame F. This seal S comprises a cone 70, of yieldable and corrosion-resistant material such as rubber, removably attached to the lower end of frame F by a screw 72 threaded into a member 74 that is welded or otherwise fastened centrally to the arms 58 of the frame F. The cone 70 is adapted to cooperate with an internal annular flange or restriction 76 formed by the extension of top 28' of shell 28. The restriction 76 provides a passage or aperture 76', of smaller diameter than the base of the cone 70, between the interior of the shell 28 and the interior of the tube 24. The coil springs 64 normally urge the frame F upwardly to a position at which the top surface of the cone 70 engages the edge of the annular flange 76 to form a seal and prevent access of water or moisture to the carbide within the holder H.

In order to generate acetylene it is necessary initially to move the holder H downwardly to a point where its lower perforated end becomes submerged in the water within the tank T, and to thereafter raise and set said holder at a point intermediate its lowermost position and that position at which the cone 70 engages the annular flange 76. The manually-operable positioning device P is adapted to lower and raise the holder H and the cone 70 in the manner just described. Referring to Fig. 2 of the drawings the device P comprises a U-shaped lever 78, the parallel arms 80 of which are adapted to straddle the carbide holder H and engage the ring 62. The lever 78 is integrally connected to a shaft 82 which extends through the flange 36 and a stuffing box 83 to the outside of the generator, as shown in Fig. 3. The shaft 82 is bent to an angle of 90 degrees forming an outside operating handle 84. Thus, by depressing the end of handle 84, arms 80 of lever 78 depress the frame F downwardly to any position desired by the operator.

In order to render the generation of acetylene automatic after initially charging and starting the generator, it is desirable to locate the lower end of the holder H a few inches above the average level of the water in chambers C and G and to depend upon variation in pressures within these chambers to effect the raising of the water within chamber G to contact the carbide within the holder H to thereby continue the generation of acetylene. By depressing the holder H as far down as possible, acetylene may be generated initially, and upon release of the handle 84, the springs 64 will cause the holder H to be elevated to such a position that the cone 70 engages the annular flange 76 to seal off the upper portion of chamber G from the lower portion thereof. In order to releasably lock the holder H in an intermediate position between its lower and upper positions, a locking device has been provided for cooperating with the handle 84. Referring to Fig. 3, this device comprises a pivoted latch lever 86 provided with two arms 88 and 89. The construction of the latch 86 is such that its center of gravity is located to the right side of its pivot pin 42 as viewed in Fig. 3, thus insuring its normal position to be that disclosed in solid lines. In its normal position, the arm 88 of latch 86 interrupts the upward movement of the handle 84, thereby locating the holder H in an intermediate position between its upper and lower limits and so that automatic generation of acetylene will be effected. During shut-down periods, the handle 84 is located in the dot and dash line position shown in Fig. 2, in which location the holder H is at its uppermost limit and the seal S is effective. Upon downward displacement of the handle 84 from its uppermost position to its lowermost position, it will pass the arm 88 because the latch 86 will be free to move in a counterclockwise direction about the pivot pin 42 as shown in Fig. 3, and clockwise about said pivot pin as viewed in Fig. 2. Upon release of the lever 84 when it is in its lowermost position, its upward movement is interrupted by the arm 88 thus locking the holder H in its generating position. When it is desired to seal off that portion of the generating chamber containing the carbide from that containing the water, handle 84 may be slightly depressed so that latch 86 may be manually moved in a counterclockwise direction into the dot and dash line position as shown in Fig. 3, thus enabling handle 84 to pass the arm 88 of latch 86 as it moves to its upper position.

When it is desired to open the generator, for example, to replenish the supply of carbide, the handle 49 must be positioned to cause valve 48 to establish communication between chambers C and G. An interference rod I, which forms a part of an interference mechanism to be described later, then may be raised causing relief valves 50 and 100 to vent the generator and hydraulic valve V. While the rod I is elevated, overflow plug 22 may be removed, and upon release of rod I, it will descend to a point releasing pivot 46 of handwheel 44, which latter may then be loosened and removed from engagement with cover 38. Cover 38 may then be pivoted about eye bolt 40 and holder H may be removed and recharged with carbide cakes by inserting the same through the opening 53. The assembly of the generator is the reverse order of the above-mentioned steps of disassembly.

When the generator is in condition to be set into operation, the valve 48 is positioned to establish communication between the chambers G and C. The handle 84 is depressed until the lower end of the holder H is submerged below the water within tank T and held in this position until a pressure of approximately 15 pounds per square inch is established in the two chambers. The valve 48 is then positioned to establish communication between chamber C and the atmosphere. The pressure of the gas within the chamber G then forces water into the chamber C thus purging it of any air-gas mixture therein. Complete purging of this air-gas mixture within chamber C will be apparent upon the passage of water from the valve 48. The valve 48 is then positioned to re-establish communication between the chambers G and C and the operating handle 84 is again depressed to its lower position until sufficient acetylene has been generated within these chambers to produce a pressure adequate for operating purposes. Finally, the valve 48 is positioned to interrupt communication between the chambers G and C and to prevent communication between the atmosphere and either chamber, and from this point on, the generation of acetylene is automatic. Furthermore, the chamber C is now filled with practically pure acetylene, thereby eliminating the presence of any explosive mixture within the compression chamber. Referring to Fig. 1, the acetylene within the chamber G is adapted to exit therefrom through the pipe connection 90 to the upper portion of a hydraulic back-pressure valve V. The valve V comprises a vertically arranged substantially cylindrical tube located along the outside of the generator, said tube having an upper chamber 92 and a lower chamber 94 which are separated by a gas-tight partition. The upper chamber 92 is adapted to support a filter D through which the acetylene gas is forced as it exits from the generating chamber. The filter eliminates any solid particles or impurities from the generated gas. The location of the filter D in the upper chamber 92 of the valve V renders it easily accessible for changing, cleaning or repairing by simply removing the cover 96 from the valve V.

The acetylene passes through the filter D thence to the bottom of chamber 94 via the conduit 98. The gas is required to bubble through a volume of water contained within the chamber 90 and to ultimately pass from the upper portion of chamber 94 through a nipple 95 to the gas outlet O. The pressure-relief valve 100 is attached to the acetylene line 95 for relieving excessive pressures of acetylene within the hydraulic back-pressure valve V.

The interference mechanism previously referred to, is provided for insuring a definite sequence in the steps of charging and operating the generator so as to eliminate any dangerous conditions arising therein. This interference mechanism is substantially the same as that disclosed in connection with the acetylene generator described and claimed in copending application Serial No. 164,105 filed September 16, 1937, now Patent No. 2,242,571. It includes the vertically movable rod I having a lower portion 97 extending outwardly and downwardly along apron 26 and shell 10 to plug 22, and also having a protuberance 99 adapted to cooperate with a stop 101 associated with the valve lever 49. The rod 97 is connected to the operating levers of relief valves 50 and 100. The arrangement is substantially identical with that of said copending application in that the valve 48 must be positioned to equalize the pressure between chambers C and G prior to raising the rod I; which action opens relief valves 50 and 100. There is one difference, however, between the arrangement of the interference mechanism of the present generator and that disclosed in the above-identified copending application. This difference relates to the timing of the opening of the pressure-relief valves 50 and 100 as the interference rod I is vertically raised. The present valve-opening devices of the relief valves 50 and 100 are so positioned relative to each other that upon the vertical upward movement of the rod I, the valve 50 relieves the pressure within the compression and generating chambers C and G prior to the opening of valve 100 which latter relieves the pressure within the hydraulic back-pressure valve V. This timed relation of opening valves 50 and 100 prevents the water within valve V from being blown out of the relief valve 100 due to an excessive pressure within the generator.

Although the various features of the improved generator have been shown and described in detail to fully disclose one embodiment of the invention, it will be evident that numerous changes may be made in such detail; and certain features may be used without others, without departing from the principles of the invention.

What is claimed is:

1. An acetylene generator comprising a tank adapted to contain water in its lower portion; a gas bell open at the bottom and extending into the water within said tank and forming a gas-generating chamber above the water within said bell; a calcium carbide holder adapted to expose carbide therein to water within said tank means for supporting said carbide holder within said gas bell, whereby said holder may be raised or lowered to any one of a plurality of vertical positions therein; and sealing means connected to such supporting means adapted to cooperate with a portion of said gas bell when said supporting means is in one position, in order to effect a moisture-tight seal between the water and said carbide.

2. An acetylene generator as claimed in claim 1, in which said tank and said bell cooperate to form a chamber adapted to confine a gas above the water and outside said bell.

3. An acetylene generator as claimed in claim 1, in which said sealing means comprises a conical resilient member adapted to seat against a portion of said gas bell to effect a water-tight seal.

4. An acetylene generator as claimed in claim 1, in which said supporting means is resiliently supported within said gas bell, the construction and arrangement being such that said supporting means is urged toward a position in which said seal is effective.

5. In an acetylene generator including a tank adapted to contain water, a gas bell adapted to be partially submerged within the water within said tank, and a calcium carbide holder adapted to expose carbide therein to water in said tank; vertically movable carbide-holder-supporting means comprising a frame including a plurality of vertically-disposed rods; means supported within said gas bell through which said rods are adapted freely to pass vertically; means connecting the ends of said rods together; and resilient means between the means through which the rods pass and the means for connecting the ends of the rods together for resiliently urging said frame vertically upward within said gas bell.

6. In an acetylene generator as claimed in claim 5, wherein said resilient means comprises a plurality of springs.

7. In an acetylene generator as claimed in claim 5, wherein said resilient means comprises a plurality of coiled springs, one of such springs surrounding each of said rods.

8. An acetylene generator comprising a tank adapted to contain water; a gas bell consisting of an upper and a lower portion, and having a restriction therebetween, such portions communicating with each other through an aperture formed by said restriction said upper portion communicating with a gas exit, and said lower portion being open at its lower end and extending into the water within said tank; a carbide holder adapted to expose carbide therein to water within said tank; a carbide-holder-support adapted to support said holder within said gas bell; manually-operable means for moving said carbide-holder-support and said carbide holder vertically downward through said aperture so that a portion of said carbide is submerged within the water in said tank; sealing means secured to said support; and automatically-operable means for moving said support and said holder vertically upward through said aperture upon release of said manually operable means so that said sealing means will cooperate with said restriction to close said aperture and prevent communication between said upper and lower portions of said gas bell.

9. An acetylene generator as claimed in claim 8, in which said manually-operable means comprises a device within the upper portion of said gas bell and adapted to be operated from outside said generator for forcing said carbide holder and said carbide-holder-support vertically downward; and said automatically-operable means comprises resilient means for returning said carbide holder and said carbide-holder-support to their initial position upon release of said manually-operable means.

10. An acetylene generator as claimed in claim 8, in which said manually-operable means comprises a pivoted lever within the upper portion of said gas bell and connected to an operating handle extending from the inside of said upper portion to the outside of said generator; and said automatically-operable means comprises a plurality of compression springs within said gas bell and adapted resiliently to support said carbide-holder-support.

11. An acetylene generator comprising a tank adapted to contain water in its lower portion; a gas bell within said tank having an open lower end disposed below the normal water level in said tank, and forming a gas generating chamber above the water within said bell; a calcium carbide holder adapted to expose carbide to water within said bell; a carbide-holder-support carried by said gas bell; manually operable means for moving said carbide-holder-support vertically downward relative to said gas bell so that a portion of the carbide may be submerged within the water in said bell; automatically operable means for moving said carbide-holder-support vertically upward relative to said gas bell upon release of said manually operable means; and means on said carbide-holder-support adapted to form a water-tight seal about said carbide by cooperating with a portion of said gas bell when said automatically operable means is rendered effective.

12. An acetylene generator comprising a tank adapted to contain water in its lower portion; a gas bell open at the bottom and extending into the water within said tank and forming a gas-generating chamber above the water within said bell; means for supporting a charge of calcium carbide within said gas bell; a sealing element connected to and movable with such carbide supporting means; manually-operable means for moving said carbide-supporting means vertically downward to submerge a portion of the carbide within the water in said tank; automatically-operable means for moving said carbide-supporting means vertically upward, when said manually operable means is released, toward a position where said sealing element becomes effective; and means for interrupting the upward movement of said carbide-supporting means intermediate its lowermost position and the position where said sealing element becomes effective.

13. An acetylene generator as claimed in claim 12, in which said manually-operable means includes a handle on the outside of said generator and such interrupting means comprises a gravity-actuated element for automatically interrupting only the upward movement of said handle and consequently the upward movement of said carbide-supporting means.

14. An acetylene generator as claimed in claim 12, in which said manually-operable means includes a handle on the outside of said generator and such interrupting means comprises a gravity-actuated oscillatable element adapted normally to rest in a position for interrupting the upward movement of said handle, but capable of being manually moved to a position for permitting continued upward movement of said handle.

15. In an acetylene generator comprising a tank adapted to contain water and a gas-generating chamber above said water; a hydraulic back-pressure valve connected to said generating chamber comprising a vertically arranged substantially cylindrical tube located along the outside of the generator, said tube including an upper chamber containing a filter, and a lower chamber containing water through which the acetylene is adapted to pass, such chambers being separated by a gas-tight partition.

16. In an acetylene generator comprising a compression chamber, a generating chamber, means for establishing and interrupting gaseous communication between such chambers, a hydraulic back-pressure valve, a pressure-relief valve connected to said generating and compression chambers, and a pressure-relief valve connected to said hydraulic back-pressure valve; interference mechanism comprising means for insuring gaseous communication between said compression and generating chambers before such relief valves can be opened, said relief valves and interference mechanism being so arranged that the valve connected to the generating and compression chambers is opened prior to opening the relief valve connected to the hydraulic back-pressure valve.

RALPH C. PIERSON.